E. M. APPLEBAUGH & G. M. KELLER.
POST OR STRUT FOR BRAKE BEAMS.
APPLICATION FILED MAY 21, 1915.
1,152,262.
Patented Aug. 31, 1915.
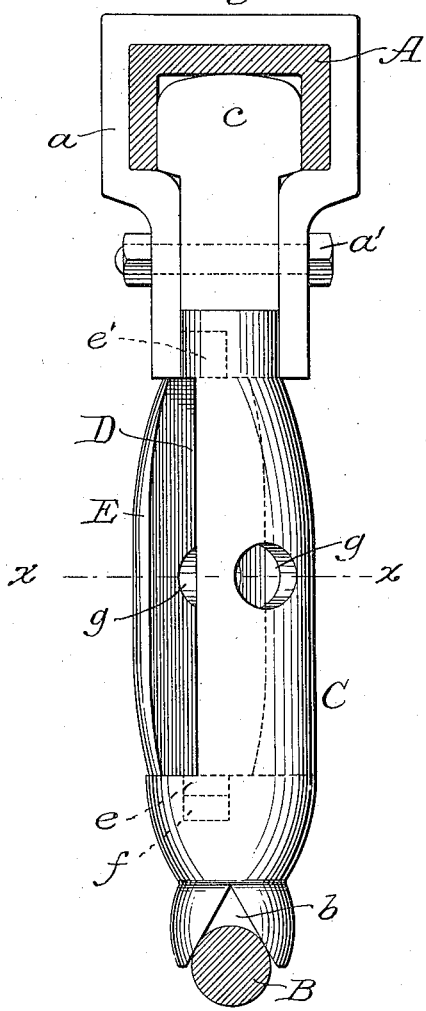
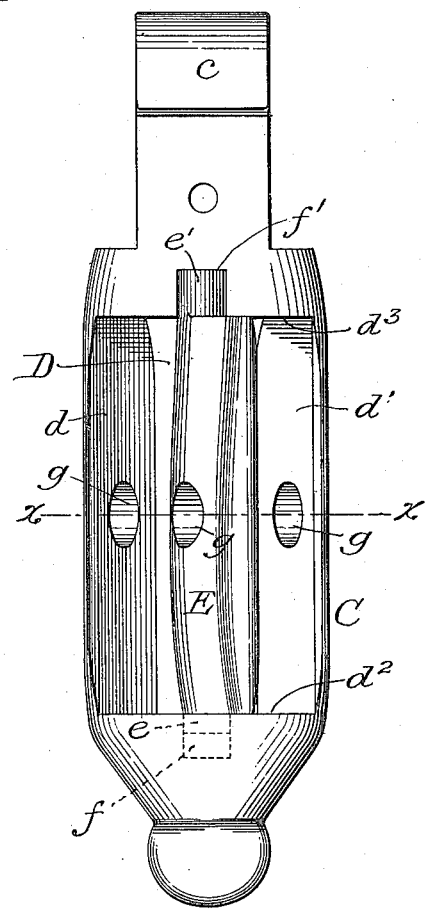
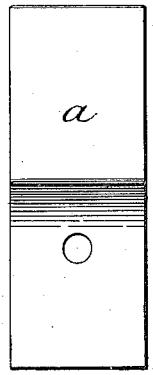
Inventors
Eugene M. Applebaugh,
George M. Keller,
By
Attorney

UNITED STATES PATENT OFFICE.

EUGENE M. APPLEBAUGH AND GEORGE M. KELLER, OF DANVILLE, PENNSYLVANIA.

POST OR STRUT FOR BRAKE-BEAMS.

1,152,262.   Specification of Letters Patent.   Patented Aug. 31, 1915.

Application filed May 21, 1915. Serial No. 29,524.

*To all whom it may concern:*

Be it known that we, EUGENE M. APPLEBAUGH and GEORGE M. KELLER, citizens of the United States, residing at Danville, in the county of Montour and State of Pennsylvania, have invented new and useful Improvements in Posts or Struts for Brake-Beams, of which the following is a specification.

Our invention relates to posts or struts for brake beams, and it has for its object the production of a strut of simple construction which may be readily adjusted for receiving and supporting a brake lever at the proper angle for use on either side of a car.

The invention consists in features of construction to be hereinafter described and particularly pointed out in the appended claims.

Referring to the drawings furnished and forming a part of this specification, Figure 1 is a side view of our improved strut connected to a brake beam, the latter with its truss member being shown in section. Fig. 2 is a plan view of the strut with the brake beam connection removed. Fig. 3 is a cross section on line X—X of Figs. 1 and 2, and Fig. 4 is a plan view of the yoke for connecting the strut to the brake beam.

Referring to Fig. 1, A indicates a brake beam which is U-shaped in cross section, but it is to be understood that our strut is applicable to any form of brake beam, it being only necessary to provide suitable connecting means. B indicates the truss member of the beam which rests in a notch or seat $b$ formed in one end of the post or strut C. The opposite end of the post C is provided with a head $c$ which fits in the channel of the brake beam A, the strut being secured to the beam by means of a yoke $a$ embracing the beam, and secured to the strut by means of a bolt $a'$ as clearly illustrated.

The strut C is provided with a slot D for receiving the brake lever (not shown), and the side walls $d$ and $d'$ of said slot diverge outwardly to permit the brake lever to be positioned at the proper angle for use on either side of a car, it being well understood that the angle of the brake lever is governed by the arrangement of the brake-rigging. Pivotally mounted between the side walls $d$ and $d'$ of the slot D is a plate E provided with pivot extensions $e$ and $e'$ at its opposite ends. The pivot extension $e$ is inserted in a socket $f$ formed in the end wall $d^2$ of the slot D. The opposite end wall $d^3$ of said slot is provided with an open slot $f'$ for receiving the pivot extension $e'$ of the plate E. Said pivot extension $e'$ is confined in the slot $f'$ by one end of the yoke $a$, as clearly shown in Fig. 1. The plate E is so mounted on its pivotal extensions within the slot D, that it may be turned into parallelism with either of the walls $d$ or $d'$. The plate E and the walls $d$ and $d'$ are each apertured as at $g$ for receiving the fulcrum pin upon which the brake lever is supported.

It will now be seen that a brake lever may be supported at either of two angles, *i. e.*, either in line with the wall $d$ or the wall $d'$ of the slot D, the plate E being turned at the proper angle to confine the brake lever in proper position, and affording support for the inner end of the fulcrum pin (not shown); and it will also be seen that the above described adjustment may be made without the separation of any of the parts of the strut.

Having thus described our invention, what we claim as new and desire to secure by Letters Patent, is—

1. A post or strut for brake beams provided with a slot for receiving a brake beam lever, the inner side walls of said slot diverging outwardly for positioning the lever for either side of a car, and a plate pivotally mounted in said slot and adapted to be turned into parallelism with either of said diverging walls.

2. A post or strut for brake beams provided with a slot for receiving a brake lever, the inner side walls of said slot diverging outwardly to position the lever for either side of a car, one of the end walls of said slot being provided with a pivot receiving socket, the other end wall of said slot being provided with an open pivot receiving slot, a plate having pivot extensions at opposite ends, one of said extensions being inserted in said socket, and the other of said extensions being positioned in said open slot, and means for confining the last mentioned extension in said open slot.

3. A post or strut for brake beams provided with a slot for receiving a brake lever, the inner side walls of said slot diverging outwardly to position the lever for either side of a car, one end wall of said slot being provided with a pivot receiving socket, the other end wall of said slot being provided with an open pivot receiving slot, a plate provided with pivot extensions at opposite ends, one of said extensions being inserted in said pivot socket and the other of said extensions being positioned in said open pivot receiving socket, means for securing said strut to a brake beam, said means operating to hold said last mentioned pivot extension in said open pivot receiving slot.

In testimony whereof we have hereunto set out hands.

EUGENE M. APPLEBAUGH.
GEORGE M. KELLER.

Copies of this patent may be obtained for five cents each, by addressing the "Commissioner of Patents, Washington, D. C."